(12) United States Patent
Kosaka

(10) Patent No.: US 12,716,779 B2
(45) Date of Patent: Aug. 25, 2026

(54) METHOD FOR MANUFACTURING BOLOMETER

(71) Applicant: NEC Corporation, Tokyo (JP)

(72) Inventor: Mayumi Kosaka, Tokyo (JP)

(73) Assignee: NEC CORPORATION, Tokyo (JP)

( * ) Notice: Subject to any disclaimer, the term of this patent is extended or adjusted under 35 U.S.C. 154(b) by 473 days.

(21) Appl. No.: 18/204,670

(22) Filed: Jun. 1, 2023

(65) Prior Publication Data

US 2023/0408340 A1 Dec. 21, 2023

(30) Foreign Application Priority Data

Jun. 7, 2022 (JP) ................................ 2022-091974

(51) Int. Cl.
*G01J 5/20* (2006.01)

(52) U.S. Cl.
CPC ...................................... *G01J 5/20* (2013.01)

(58) Field of Classification Search
CPC ........................................................ G01J 5/20
See application file for complete search history.

(56) References Cited

U.S. PATENT DOCUMENTS 7,723,684 B1 * 5/2010 Haddon .................... G01J 5/12 250/338.1
2010/0074835 A1 * 3/2010 Mercuri ................. B82Y 40/00 423/445 B
2013/0164685 A1 * 6/2013 Huang .................. G03F 7/3021 156/345.23
2022/0364928 A1 * 11/2022 Kosaka ................. G01J 5/0205

FOREIGN PATENT DOCUMENTS

JP 2015-049207 A 3/2015
JP 2018-148138 A 9/2018
JP 2022-025051 A 2/2022
WO 2012/049801 A1 4/2012
WO 2020/158455 A1 8/2020
WO 2021/241575 A1 12/2021

OTHER PUBLICATIONS

JP Office Communication for JP Application No. 2022-091974, mailed on Feb. 3, 2026 with English Translation.

* cited by examiner

*Primary Examiner* — Marlon T Fletcher
*Assistant Examiner* — Kimberly Newman Frey
(74) *Attorney, Agent, or Firm* — Sughrue Mion, PLLC

(57) ABSTRACT

An object of the present invention is to provide a method for manufacturing a bolometer with a resistance value.

A method for manufacturing bolometer comprising:

(A) forming one or more electrode pair(s) on a substrate;

(B) forming an intermediate layer between the electrode pair(s) on the substrate; and (C) forming a carbon nanotube layer, comprising the following (c1) to (c3):

(c1) applying a carbon nanotube dispersion onto the intermediate layer between the electrode pair and allowing it to stand to form a carbon nanotube pre-film;

(c2) washing the carbon nanotube pre-film with a washing solvent; and (c3) drying the washing solvent while applying a centrifugal force, wherein a vertical component of relative centrifugal acceleration with respect to at least one of a first electrode wall and a second electrode wall facing each other of the electrode pair is in the range of 50×g to 900×g.

10 Claims, 10 Drawing Sheets

FIG. 4

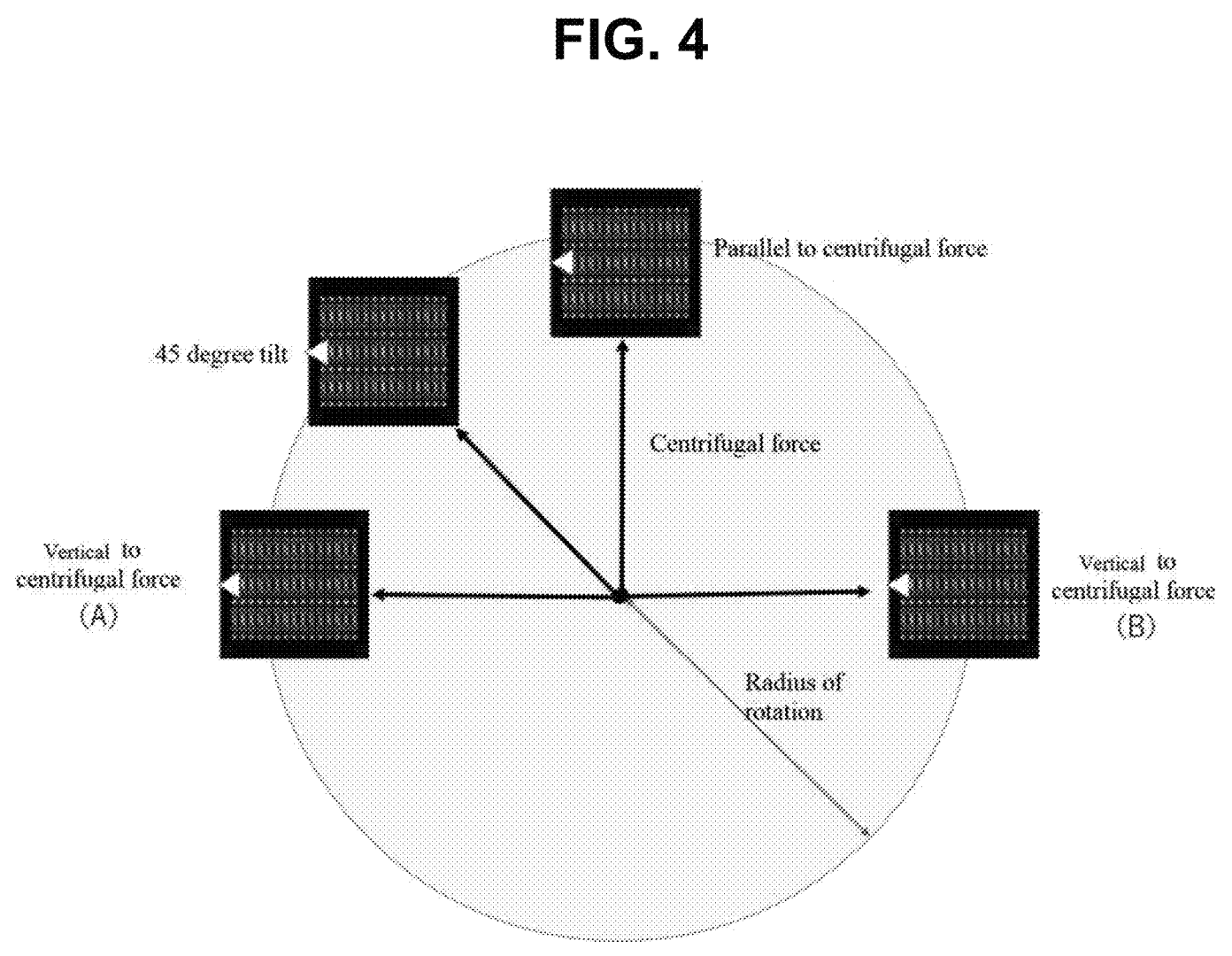

Vertical to centrifugal force (B)

Parallel to centrifugal force

Centrifugal force

Radius of rotation 45 degree tilt

Vertical to centrifugal force (A)

prior art

METHOD FOR MANUFACTURING BOLOMETER

This application is based upon and claims the benefit of priority from Japanese patent application No. 2022-91974, filed on Jun. 7, 2022, the disclosure of which is incorporated herein in its entirety by reference.

TECHNICAL FIELD

The present invention relates to a method for manufacturing a bolometer using carbon nanotubes.

BACKGROUND ART

Infrared sensors are classified into a cooled type (quantum type) and an uncooled type (thermal type) depending on the built-in detector. The cooled infrared sensor requires a cooling device, so it is difficult to reduce in size and very expensive to manufacture. On the other hand, the uncooled infrared sensor can be operated at room temperature, so it does not require a cooling device. Thus, the uncooled infrared sensor is easy to reduce in size and cost, and the use thereof is expanding in application such as security and thermography.

A bolometer is widely used as an uncooled infrared sensor. In order to increase the sensitivity of the bolometer, it is necessary to improve the absolute value of the temperature coefficient of resistance (TCR) of the bolometer material and reduce the resistance value.

Currently, vanadium oxide and amorphous silicon are used as element materials for bolometers. However, vanadium oxide has a low TCR, which limits its performance. And amorphous silicon has a high resistance value, and has not been able to perform better than vanadium oxide yet.

In such a technical background, the use of carbon nanotubes (CNT), which have a high absolute value of TCR, in the bolometer is being studied. For example, semiconducting single-walled CNTs are used in the bolometer portion in Patent Document 1.

CITATION LIST

Patent Literature

Patent Document 1: Japanese Patent Laid-Open No. 2015-49207

SUMMARY OF INVENTION

Technical Problem

However, in order to put an infrared sensor using carbon nanotubes (i.e., uncooled CNT infrared sensor) into practical use, it is necessary not only to improve TCR, but also to improve characteristics such as lowering the resistance. The resistance value of the CNT bolometer is the sum of the bulk resistance of the bolometer film and the connection resistance between the bolometer film and the electrodes. Therefore, in order to reduce the resistance value of the CNT bolometer, it is important to reduce the connection resistance with the electrodes in addition to reducing the bulk resistance of the bolometer film.

An object of the present invention is to provide a method of manufacturing a bolometer with a low resistance value.

Solution to Problem

To achieve the purposes mentioned above, a method for manufacturing bolometer of the present invention comprises:

(A) forming one or more electrode pair(s) on a substrate;

(B) forming an intermediate layer between the electrode pair(s) on the substrate; and (C) forming a carbon nanotube layer, comprising the following (c1) to (c3):

- (c1) applying a carbon nanotube dispersion onto the intermediate layer between the electrode pair and allowing it to stand to form a carbon nanotube pre-film;
- (c2) washing the carbon nanotube pre-film with a washing solvent; and
- (c3) drying the washing solvent while applying a centrifugal force, wherein a vertical component of relative centrifugal acceleration with respect to at least one of a first electrode wall and a second electrode wall facing each other of the electrode pair is in the range of 50×g to 900×g.

Advantageous Effect of Invention

As described above, the present invention can provide a method for manufacturing a bolometer with a low resistance value.

BRIEF DESCRIPTION OF DRAWINGS

FIG. 4 shows orientations of bolometer arrays with respect to centrifugal force.

DESCRIPTION OF EMBODIMENTS

[Bolometer]

Figure 1A:
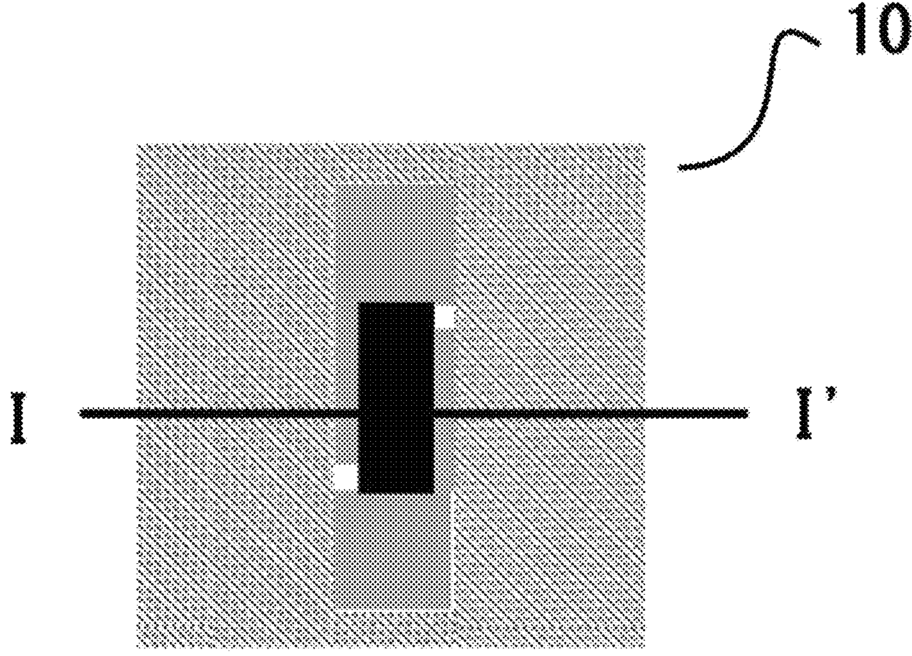
FIG. 1A is a top view showing the bolometer of one embodiment of the present invention.
Figure 1B:
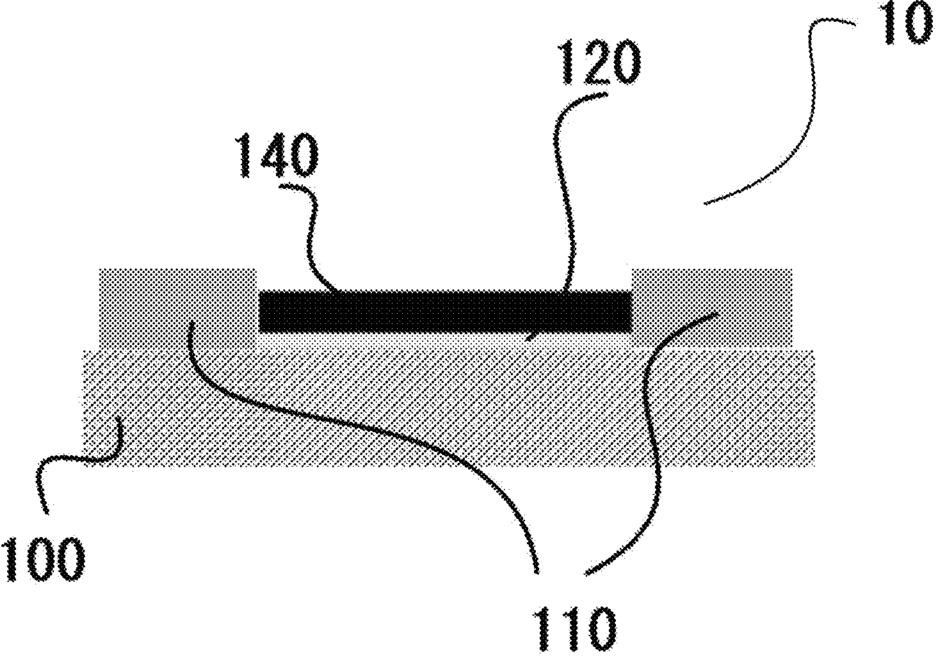
FIG. 1B is a cross-sectional view taken along line I-I' of FIG. 1A.

FIG. 1A and FIG. 1B show the structure of the bolometer of one embodiment of the present invention manufactured by the method described later. The bolometer comprises an electrode pair 110 provided on a substrate 100; an intermediate layer 120 provided between the electrode pair 110 on the substrate 100; and a carbon nanotube layer 140 provided on the intermediate layer 120. A carbon nanotube layer 140 exists between two electrodes (i.e., the electrode pair 110)

and is electrically connected by contacting the opposing sidewalls of the electrode pair.

Figure 10:
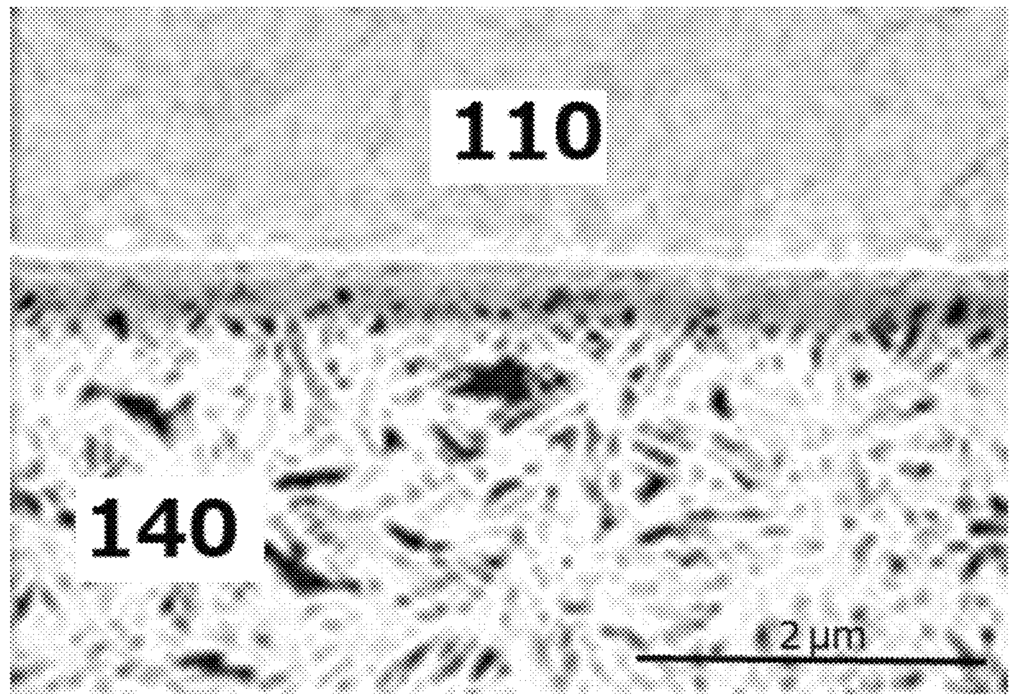
FIG. 10 is an SEM image of a part where a carbon nanotube film and an electrode wall are joined.

In the bolometer of the present invention, the carbon nanotube layer formed between the electrode pair does not bridge the two electrodes (i.e., electrode pair), and is only provided between the electrode pair (see FIG. 10). Thus, the contact state between the facing sidewalls of the electrode pair and the CNT film is important in order to reduce the resistance value of the bolometer. The inventors presume that the CNT film is in good contact with the electrode walls according to the manufacturing method according to the present invention, thereby manufacturing a bolometer with a low resistance value. For example, the bolometer of the present invention has a resistance value of $1.0\times10^{10}\Omega$ or less, preferably $1.0\times10^{9}\Omega$ or less at a voltage of 3V.

[Method for Manufacturing Bolometer]

Figure 2:
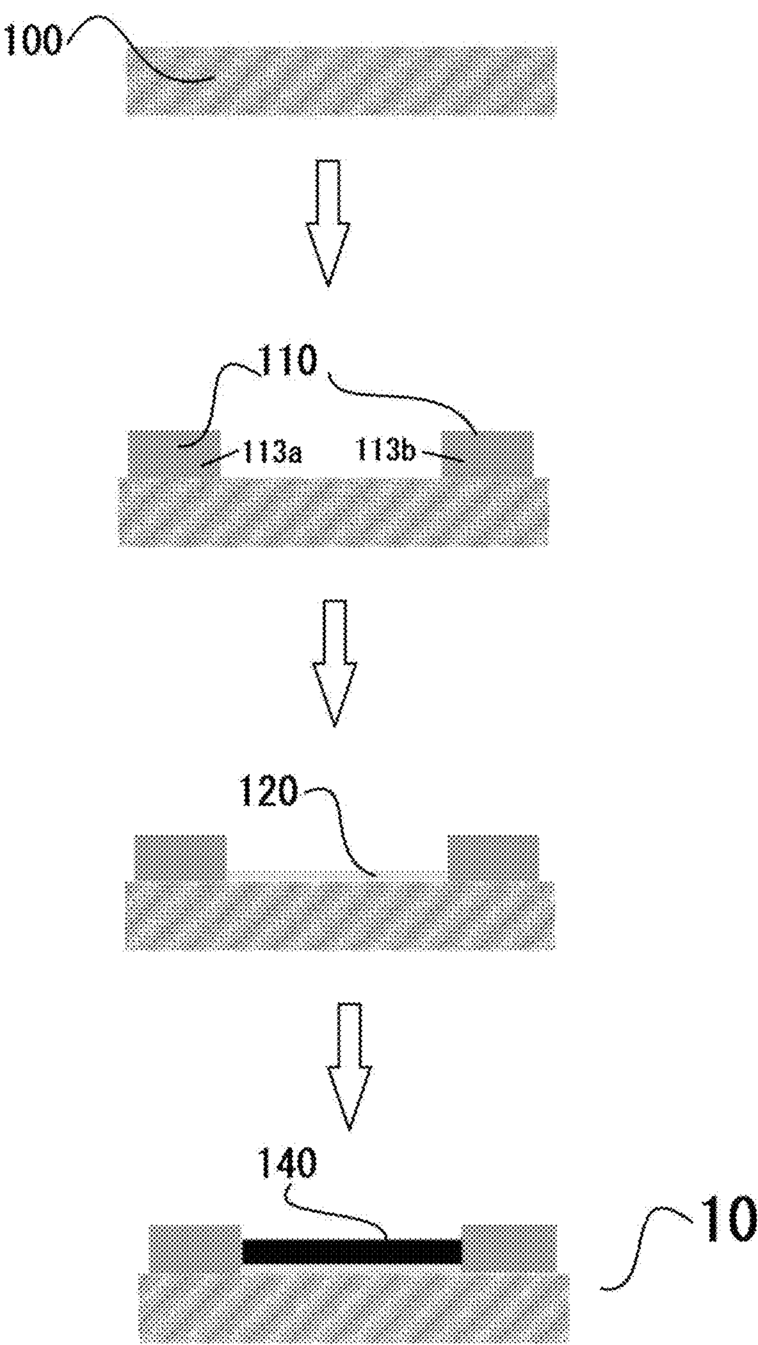
FIG. 2 is a cross-sectional view showing a method for manufacturing a bolometer of one embodiment of the present invention.

FIG. 2 shows a manufacturing method of a bolometer of one embodiment of the present invention.

The method for manufacturing bolometer 10 according to one embodiment of the present invention comprises:

- (A) forming one or more electrode pair(s) 110 on a substrate 100;
- (B) forming an intermediate layer 120 between the electrode pair(s) 110 on the substrate 100; and
- (C) forming a carbon nanotube layer, comprising the following (c1) to (c3):
  - (c1) applying a carbon nanotube dispersion onto the intermediate layer 120 between the electrode pair 110 and allowing it to stand to form a carbon nanotube pre-film;
  - (c2) washing the carbon nanotube pre-film with a washing solvent; and
  - (c3) drying the washing solvent while applying a centrifugal force, wherein a vertical component of relative centrifugal acceleration with respect to at least one of a first electrode wall 113*a* and a second electrode wall 113*b* facing each other of the electrode pair 110 is in the range of 50×g to 900×g.

(A) Formation of Electrode Pair

Two electrodes (i.e., electrode pair 110) are formed on the substrate 100 with a space therebetween. Although the method of manufacturing the electrode pair 110 is not particularly limited, it can be formed by vapor deposition, sputtering, printing, pressing, and the like. In addition, a desired shape may be formed using a photomask, a metal mask, and the like. Alternatively, a pre-formed metal thin film and the like may be used. The electrode pair 110 may be one pair, or may be formed in an array by arranging a plurality of electrode pairs in the vertical and horizontal directions on the substrate.

The materials of the substrate may be inorganic materials or organic materials, and any materials used in this technical field can be used without limitation. Examples of the inorganic materials include, without limitation, glass, Si, $SiO_2$, SiN and the like. The organic materials include, without limitation, plastic, rubber, and the like, for example, polyimide, polyethylene, polypropylene, polystyrene, polyvinyl chloride, polyethylene terephthalate, acrylonitrile styrene resin, acrylonitrile butadiene styrene resin, fluor resin, methacryl resin, polycarbonate, and the like. The substrate may be either a flexible substrate or a rigid substrate, but is preferably a flexible substrate.

Examples of the materials of the electrode are not limited if it has conductivity, and gold, platinum, titanium, and the like may be used singly or in combination. The height of the electrode pair can be adjusted appropriately, but is preferably 10 nm to 1 mm, more preferably 50 nm to 1 μm, and particularly preferably 50 nm to 200 nm. The distance between the electrode pair 110 is preferably 1 μm to 500 μm, and more preferably 5 to 200 μm for reducing in size of the bolometer.

(B) Formation of Intermediate Layer

An intermediate layer 120 is formed between the electrode pair 110 on the substrate 100. In the bolometer 10 according to the present invention, the intermediate layer 120 has the function of enhancing the bonding between the substrate 100 and the carbon nanotube layer 140. The intermediate layer can be formed by applying a solution of the intermediate layer material onto the substrate, washing with water, and drying if necessary. The solution of the intermediate layer material may be applied by immersing the substrate in the solution, or by spraying the solution onto the substrate. Prior to applying the solution, areas other than the area where the intermediate layer is to be formed may be protected with various mask materials.

The material of the intermediate layer 120 is not particularly limited, but is preferably a compound having both a partial structure that binds or adheres to the substrate surface and a partial structure that binds or adheres to the carbon nanotube. Thereby, the intermediate layer acts as an intermediary that bonds the substrate and the carbon nanotube layer. Here, the bond between the substrate and the intermediate layer and the bond between the intermediate layer and the carbon nanotube layer include not only chemical bonds but also electrostatic interactions, surface adsorption, hydrophobic interactions, Van der Waals' forces, hydrogen bonding, and other intermolecular interactions.

Examples of the partial structure of the intermediate layer material that bonds or adheres to the substrate surface include an alkoxysilyl group (SiOR), SiOH, a hydrophobic moiety or a hydrophobic group, and the like. Hydrophobic moieties or hydrophobic groups include methylene groups (methylene chains), alkyl groups and the like having 1 or more, preferably 2 or more, and preferably 20 or less, more preferably 10 or less carbon atoms.

Examples of the partial structure of the intermediate layer material that binds or adheres to the carbon nanotube layer include amino groups such as a primary amino group ($—NH_2$), a secondary amino group ($—NHR^1$) and a tertiary amino group ($—NR^1R^2$), an ammonium group ($—NH_4$), an imino group (=NH), an imido group (—C(=O)—NH—C(=O)—), an amide group (—C(=O)NH—), an epoxy group, an isocyanurate group, an isocyanate group, an ureido group, a sulfide group, a mercapto group, and the like.

Examples of materials for such an intermediate layer include silane coupling agents. A silane coupling agent has both a reactive group that binds or interacts with an inorganic material and a reactive group that binds or interacts with an organic material in its molecule, and acts to bind an organic material and an inorganic material. In this embodiment, carbon nanotubes can be immobilized on a substrate by forming a single-layer polymer film presenting reactive groups that bind to the carbon nanotubes on the substrate, for example, using a silane coupling agent that has both a reactive group that binds to a substrate such as a Si substrate and a reactive group that binds to a carbon nanotube.

Examples of silane coupling agents include:

silane coupling agents having an amino group and an alkoxysilyl group (aminosilane compounds) such as 3-aminopropyltrimethoxysilane, 3-aminopropylmethyltriethoxysilane, 3-aminopropylmethyltrimethoxysilane, 3-aminopropyltriethoxysilane (APTES), 3-(2-aminoethyl)aminopropyltrimethoxysilane, N-(2-aminoethyl)-3-aminopropyltrimethoxysilane, N-2-

(aminoethyl)-3-aminopropylmethyltrimethoxysilane, N-(2-aminoethyl)-3-aminopropylmethyldimethoxysilane, and the like;

silane coupling agents having an epoxy group and an alkoxysilyl group 3-glycidoxypropyltrimethoxysilane, 3-glycidoxypropyltriethoxysilane, 3-glycidoxypropylmethyldimethoxysilane, 3-glycidoxypropylmethyldiethoxysilane, 2-(3,4-epoxy cyclohexyl)ethyltrimethoxysilane, 3-glycidoxypropyldiethoxysilane, triethoxy(3-glycidyloxypropyl)silane, and the like;

isocyanurate-based silane coupling agents such as tris-(trimethoxysilylpropyl)isocyanurate, and the like;

ureido-based silane coupling agent such as 3-ureidopropyl trialkoxysilane, and the like;

mercapto-based silane coupling agent such as3-mercaptopropylmethyldimethoxysilane, 3-mercaptopropyltrimethoxysilane, 3-mercaptopropyltriethoxysilane, and the like;

sulfide-based silane coupling agent such as bis(triethoxysilyl propyl)tetrasulfide, and the like; and isocyanate-based silane coupling agent such as 3-isocyanate propyltriethoxysilane, and the like.

The material of the intermediate layer described above can be appropriately selected in consideration of the material of the substrate to be used, but a silane coupling agent having an amino group (aminosilane compound) is preferred and 3-aminopropyltriethoxysilane (APTES) is particularly preferred, because it has good bonding properties with carbon nanotubes.

The concentration of the intermediate layer material in the solution of the intermediate layer material is not particularly limited and may be changed as appropriate depending on the material used, and is preferably 0.001% by volume to 30% by volume, more preferably 0.01% by volume to 10% by volume, and particularly preferably 0.05% by volume to 5% by volume. The solvent for the intermediate layer material solution is not particularly limited if it can dissolve the intermediate layer material and can be easily removed after being applied to the substrate.

The thickness of the intermediate layer is not particularly limited, but can be 5 nm to 10 μm, preferably 10 nm to 1 μm, from the viewpoint of uniform adhesion.

(C) Formation of Carbon Nanotube Layer

A carbon nanotube layer 140 (also referred to as "carbon nanotube film" or "CNT film") is formed by (c1) applying a carbon nanotube dispersion onto the intermediate layer 120 and left to stand to form a carbon nanotube pre-film; (c2) washing the carbon nanotube pre-film with a solvent; and (c3) drying the washing solvent.

The carbon nanotube layer preferably has a highly uniform network-like structure composed of a plurality of carbon nanotubes forming conductive paths that electrically connect electrodes.

The thickness of the carbon nanotube layer is not particularly limited, but it ranges, for example, from 1 nm to 100 μm, preferably from 10 nm to 10 μm, more preferably from 50 nm to 10 μm. The carbon nanotube layer may be one layer or multiple layers. The carbon nanotube layer of the bolometer of the present invention may be formed on the upper surfaces of the electrodes in addition to between the electrode pairs. However, the carbon nanotube on the upper surface of the electrode does not contribute as a bolometer film because the carbon nanotube layer on the upper surface of the electrode and the carbon nanotube layer between the electrodes are not connected to each other.

(c1) Formation of Carbon Nanotube Pre-Film

A carbon nanotube preliminary layer is formed by dropping a carbon nanotube dispersion onto the intermediate layer 120 and leaving the intermediate layer 120 to stand while the droplets of the carbon nanotube dispersion are placed thereon.

The carbon nanotubes used in the dispersion may be heat-treated in an inert atmosphere or in vacuum to remove surface functional groups, impurities such as amorphous carbon, catalysts, and the like. The temperature of the heat treatment can be selected as appropriate, but is preferably 800 to 2000° C., more preferably 800 to 1200° C.

Single-walled, double-walled, and multi-walled carbon nanotubes can be used as carbon nanotubes. Single-walled carbon nanotubes are preferably 80% by mass or more, more preferably 90% by mass or more (including 100% by mass) of the total of the carbon nanotubes.

The diameter of the carbon nanotube is not particularly limited, but is preferably between 0.6 and 1.5 nm, more preferably between 0.6 and 1.2 nm, and even more preferably between 0.7 and 1.1 nm. If the diameter of the carbon nanotube is 0.6 nm or more, the production of carbon nanotube is easier, and if the diameter of the carbon nanotube is 1.5 nm or less, it is easy to maintain the bandgap within an appropriate range, and a high TCR can be obtained.

The length of the carbon nanotube is not particularly limited, but is preferably 100 nm to 5 μm, because it is easy to disperse and has excellent coatability. Also, the length is preferably 100 nm or more from the viewpoint of the conductivity of the carbon nanotube. If the length is 5 μm or less, aggregation of the carbon nanotube on the substrate can be easily suppressed. The length of the carbon nanotube is more preferably 500 nm to 3 μm, and still more preferably 700 nm to 1.5 μm.

It is preferable to use a semiconducting carbon nanotube having a large bandgap and carrier mobility as a carbon nanotube. The percentage of semiconducting carbon nanotubes in the total carbon nanotubes is generally 67% by mass or more, preferably 70% by mass or more, more preferably 80% by mass or more, particularly 90% by mass or more, more preferably 95% by mass or more, and further preferably 99% by mass or more (including 100% by mass).

The concentration of carbon nanotubes in the dispersion is not particularly limited, but can be, for example, 0.0003% by mass or more, preferably 0.001% by mass or more, more preferably 0.003% by mass or more, and 10% by mass or less, preferably 3% by mass or less, more preferably 0.3% by mass or less.

The carbon nanotube dispersion preferably contains a surfactant in addition to the carbon nanotubes. The surfactant contained in the dispersion is preferably a nonionic surfactant. Nonionic surfactants, unlike ionic surfactants, interact weakly with carbon nanotubes and can be easily removed after the dispersion is applied on the substrate. Therefore, a stable carbon nanotube conductive path can be formed and an excellent TCR value can be obtained. In addition, a nonionic surfactant with a long molecular length increases the distance between carbon nanotubes when a dispersion is applied on a substrate, making it difficult for the carbon nanotubes to reaggregate after evaporation of water, so that the network state can be maintained.

Nonionic surfactants can be selected as appropriate, but it is preferable to use one kind or a combination of a plurality of nonionic surfactants composed of a non-ionized hydrophilic portion and a hydrophobic portion such as an alkyl chain, such as nonionic surfactants with a polyethylene glycol structure represented by polyoxyethylene alkyl ether, alkyl glucoside nonionic surfactants and the like. Polyoxyethylene alkyl ethers are preferably used as such nonionic surfactants. Also, the alkyl moiety may contain one or more unsaturated bonds. In particular, polyoxyethylene(23)lauryl ether, polyoxyethylene(20)cetyl ether, polyoxyethylene(20) stearyl ether, polyoxyethylene(10)oleyl ether, polyoxyethylene(10)cetyl ether, polyoxyethylene(10)stearyl ether, polyoxyethylene(20)oleyl ether, polyoxyethylene(100)stearyl ether are and the like are more preferable. N,N-bis[3-(D-gluconamide)propyl]deoxycholamide, n-dodecylβ-D-maltoside, octyl β-D-glucopyranoside and digitonin can also be used.

Polyoxyethylene sorbitan monostearate (for example, molecular formula: $C_{64}H_{126}O_{26}$, trade name: Tween 60 manufactured by Sigma-Aldrich), polyoxyethylene sorbitan trioleate (for example, molecular formula: $C_{24}H_{44}O_6$, trade name: Tween 85 manufactured by Sigma-Aldrich), octylphenol ethoxylate (for example, molecular formula: $C_{14}H_{22}O(C_2H_4O)_n$, n=1 to 10, trade name: Triton X-100 manufactured by Sigma-Aldrich), polyoxyethylene(40) isooctyl phenyl ether (for example, molecular formula: $C_8H_{17}C_6H_{40}(CH_2CH_2O)_{40}H$, trade name: Triton X-405 manufactured by Sigma-Aldrich), Poloxamer (for example, molecular formula: $C_5H_{10}O_2$, trade name: Pluronic manufactured by Sigma-Aldrich), polyvinylpyrrolidone (for example, molecular formula: $(C_6H_9NO)_n$, n=5 to 100, manufactured by Sigma-Aldrich), and the like can also be used as nonionic surfactants.

The concentration of the surfactant in the carbon nanotube dispersion can be appropriately controlled, it is preferably the critical micelle concentration to about 5% by mass, more preferably 0.001% by mass to 3% by mass, and particularly preferably 0.01 to 1% by mass in order to suppress reaggregation after coating. If the concentration of the surfactant is less than the critical micelle concentration, it cannot be dispersed, which is not preferable. As used herein, the critical micelle concentration is the concentration at which an inflection point of the surface tension is obtained, when the surface tension is measured while changing the concentration of the surfactant aqueous solution using a surface tensiometer such as Wilhelmy surface tensiometer at 25° C. under atmospheric pressure.

The dispersion medium for the carbon nanotube dispersion is not particularly limited if it can disperse and float the carbon nanotubes. Examples thereof include water, heavy water, organic solvents, and mixtures thereof, with water being preferred.

A method for obtaining a carbon nanotube dispersion is not particularly limited, and a conventionally known method can be applied. For example, a carbon nanotube dispersion (micelle dispersion solution) is prepared by mixing a carbon nanotube mixture, a dispersion medium, and a nonionic surfactant to prepare a solution containing carbon nanotubes, and subjecting this solution to ultrasonic treatment to disperse the carbon nanotubes. In addition to or in place of the ultrasonication described above, dispersion techniques of carbon nanotube by mechanical shear force may also be used. Mechanical shearing may be performed in the gas phase. The carbon nanotubes are preferably in an isolated state in the micelle-dispersed aqueous solution of the carbon nanotubes and the nonionic surfactant. Therefore, bundles, amorphous carbon, impurity catalysts, and the like may be removed by ultracentrifugation, if necessary. During the dispersion treatment, the carbon nanotubes can be cut, and the length of the carbon nanotubes can be controlled by changing the crushing conditions of the carbon nanotubes, the ultrasonic output, the ultrasonic treatment time, and the like. For example, untreated carbon nanotubes can be pulverized with tweezers, ball mills, and the like to control the aggregate size. After these treatments, the length of the carbon nanotubes can be controlled to 100 nm to 5 μm by using an ultrasonic homogenizer with an output of 40 to 600 W, optionally 100 to 550 W, 20 to 100 KHz and treatment time of 1 to 5 hours, preferably 1 to 3 hours. If the dispersion treatment time is shorter than 1 hour, depending on the conditions, there may be little dispersion and the original length may be maintained. The dispersion time is preferably 3 hours or less from the viewpoint of time reduction and cost reduction.

Dispersion and cutting of carbon nanotubes generate surface functional groups on the surface or edges of the carbon nanotubes. The functional groups generated are carboxyl groups, carbonyl groups, hydroxyl groups, and the like. Carboxyl groups and hydroxyl groups are generated by the treatment in the liquid phase, and carbonyl groups are generated by the treatment in the gas phase.

The method for applying the carbon nanotube dispersion is not particularly limited, but it is preferably formed using a printing technique. Printing methods include coating (dispenser, inkjet) and transfer (microcontact printing, gravure printing). The application amount of the carbon nanotube dispersion can be appropriately selected according to the density and thickness of the carbon nanotube layer to be formed.

The standing time after application of the carbon nanotube dispersion is not particularly limited, but is, for example, 1 minute to 24 hours, preferably 5 minutes to 18 hours, and more preferably 30 minutes to 12 hours. It is also possible to control the adhesion amount of carbon nanotubes by varying the standing time.

(c2) Washing

The carbon nanotube pre-film formed is washed with a washing solvent. The washing solvent is preferably alcohol such as ethanol or isopropyl alcohol, or water, and washing is preferably performed multiple times.

(c3) Drying

In the present invention, the drying of the washing solvent is carried out by centrifugal drying. Examples of the centrifugal drying apparatus include those having a turntable that rotates around a rotation axis along a horizontal plane, such as a spin coater. The centrifugal drying is performed under the condition that the vertical component of the relative centrifugal acceleration with respect to at least one of the first electrode wall 113*a* and the second electrode wall 113*b* facing each other of the electrode pair 110 is in the range of 50×g to 900×g, preferably 100×g to 900×g, and particularly preferably 100×g to 800×g. If the vertical component of the relative centrifugal acceleration with respect to the electrode wall is less than 50×g or more than 900×g, the resistance value of the bolometer will increase, which is undesirable. In the present invention, the term "vertical component of the relative centrifugal acceleration" is the same as the relative centrifugal acceleration when the orientation of the electrode wall is vertical to the centrifugal force; it is 1/1.414 of the relative centrifugal acceleration when the orientation of the electrode wall is 45° to the centrifugal force; and it is 0 when the orientation of the electrode wall is parallel to the centrifugal force.

Relative centrifugal acceleration is calculated by the following formula and is usually expressed with "×g" or "G" (1.0×g=9.8 m/s$^2$).

$$\text{Relative centrifugal acceleration} = 1.118 \times 10^{-5} \times N^2 \times r$$

(wherein N is the number of revolutions per minute (rpm) and r is the radius of rotation (cm).)

The washing solvent may be dried by applying a centrifugal force in a direction having a vertical component of the relative centrifugal acceleration to at least one of the first electrode wall 113*a* and the second electrode wall 113*b* facing each other of the electrode pair 110. It is preferable to apply both of a centrifugal force oriented with a vertical component with respect to the first electrode wall and a centrifugal force oriented with a vertical component with respect to the second electrode wall. It is particularly preferable to alternately reverse the direction of the centrifugal force and perform drying multiple times. FIG. 4 shows the orientation of the bolometer array with respect to the centrifugal force (parallel, 45°, and two vertical directions).

In the drying of the washing solvent, the ratio which is the vertical component of the relative centrifugal acceleration (×g)/the height of electrode pair (nm) is preferably less than 4, more preferably 0.5 to 3.5, and particularly preferably 1 to 3. When the ratio which is the vertical component of the relative centrifugal acceleration (×g)/the height of the electrode pair (nm) exceeds 4, the resistance value of the bolometer may become high.

Figure 3:
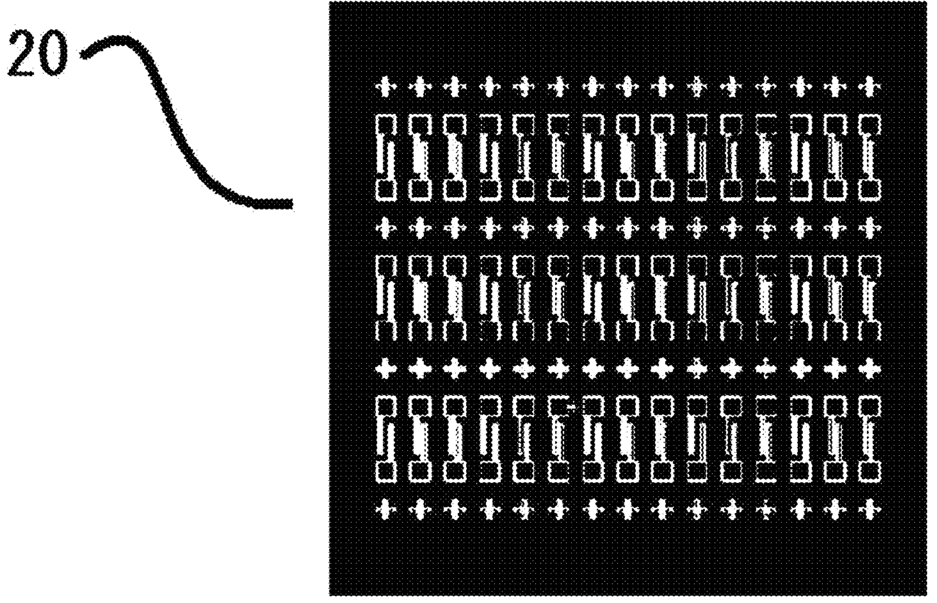
FIG. 3 is a top view showing a bolometer array in which bolometer cells are arranged in an array.
Figure 9:
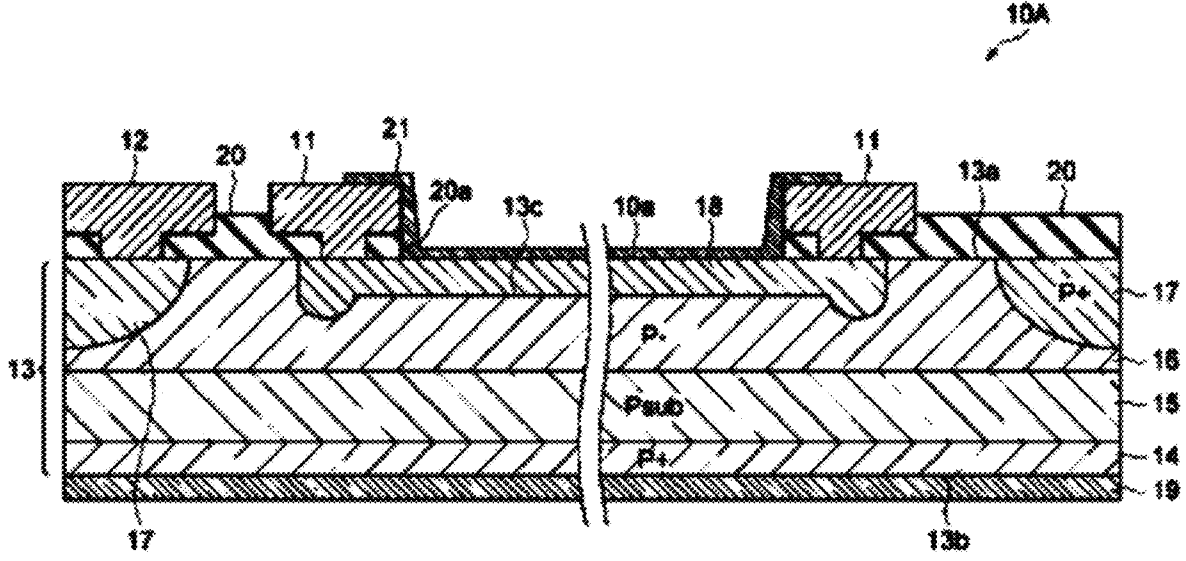
FIG. 9 is a cross-sectional view of a bolometer manufactured by the method described in Japanese Patent Laid-Open No. 2018-148138.

In the method of forming a carbon nanotube film by applying a carbon nanotube dispersion by centrifugal force such as spin coating as in Japanese Patent Laid-Open No. 2018-148138, since the carbon nanotube film 21 is formed over the electrode 11 and straddling the electrode pair (FIG. 3 of Japanese Patent Laid-Open No. 2018-148138), the structure of the bolometer of Japanese Patent Laid-Open No. 2018-148138 (see FIG. 9) is different from that of the present invention.

The carbon nanotube layer may be heat treated to remove the surfactant and solvent. The temperature of heat treatment can be appropriately set at a temperature higher than the decomposition temperature of the surfactant, preferably 150 to 400° C., and more preferably 200 to 400° C. If the temperature is 150° C. or higher, residual decomposition products of the surfactant can be easily suppressed, and if it is 400° C. or lower, deterioration of the substrate, decomposition or size change of the carbon nanotube, separation of the functional group can be easily suppressed, which is preferable.

A protective layer may be provided on the carbon nanotube layer. The protective layer can act as an insulating protective layer, and the protective layer on the top of the carbon nanotube layer can have an effect of suppressing doping into the carbon nanotube due to adsorption of oxygen and the like. Any material that is used as a protective layer in a bolometer can be used without limitation. Examples of the material of the protective layer include silicon nitride, silicon oxide ($SiO_2$), resin such as acrylic resin such as parylene, PMMA, PMMA anisole, epoxy resin, Teflon (registered trademark) film, and the like.

Since the bolometer of the present invention uses a prescribed carbon nanotube layer having a high light absorptivity as a bolometer film, an infrared absorption layer (light absorption layer) is not necessarily required, but an infrared absorption layer may be provided if desired. The infrared absorbing layer may be provided directly on the carbon nanotube layer or may be provided on the protective layer.

When the infrared absorption layer is provided directly on the carbon nanotube layer, for example, it can be a coating film of polyimide. The infrared absorbing layer provided on the protective layer is not particularly limited, but may be, for example, a titanium nitride thin film. The thickness of the infrared absorption layer can be appropriately set depending on the material, and can be, for example, 50 nm to 1 μm.

The bolometer of the present invention does not necessarily require a light reflecting layer for reflecting infrared rays transmitted through the bolometer film, but if desired, a light reflecting layer may be provided between the carbon nanotube layer and the substrate, for example, on the substrate. However, from the viewpoint of simplification of the device structure, it is preferable not to provide the light reflecting layer.

Although one cell (single element) of the bolometer is shown above, the element structure and array structure that can be used for the bolometer can be applied without limitation. For example, bolometer elements can be arranged in an array to form a bolometer array (see FIG. 3). An array in which a plurality of elements is arranged two-dimensionally, such as those used in image sensors, may also be used.

In addition, the bolometer of this embodiment is not limited to the structure shown in FIG. 1A and FIG. 1B, it can be used in element structures normally used in bolometers without limitations, such as elements having a diaphragm structure, elements having a desired heat insulation structure such as a heat insulation layer made of a heat insulation resin instead of the diaphragm structure.

In addition to infrared light, the bolometer according to this embodiment can also be used to detect electromagnetic waves having a wavelength of 0.7 μm to 1 mm, such as terahertz waves.

EXAMPLES

The present invention will be illustrated and explained in more detail below with reference to Examples, but the present invention is not limited to Examples.

Example 1

(1) A Si substrate coated with $SiO_2$ was washed with acetone, isopropyl alcohol, and water in that order, and 5 nm of titanium and 195 nm of gold were vapor-deposited onto the substrate to form an electrode pair with a height of 200 nm and a distance between the electrodes of 100 μm.

(2) The substrate on which the electrodes were formed was washed with acetone and isopropyl alcohol in that order, and organic matters on the surface were removed by oxygen plasma treatment.

(3) A 0.1% by volume of APTES aqueous solution was applied between the electrode pair to form an intermediate layer.

(4) 100 mg of single-walled carbon nanotubes (Meijo Nanocarbon Co., Ltd., EC 1.0 (diameter: about 1.1 to 1.5 nm, average diameter 1.2 nm) were placed in a quartz boat and heat-treated using an electric furnace in a vacuum atmosphere (900° C., 2 hours). After the heat treatment, it was crushed with tweezers, 12 mg of the carbon nanotubes were immersed in 40 ml of a 1% by mass of surfactant (polyoxyethylene (100) stearyl ether) aqueous solution, fully submerged, and subjected to ultrasonic dispersion treatment (BRANSON ADVANCED-DIGITAL SONIFIER device, output 50 W) for 3 hours to obtain a carbon nanotube dispersion.

(5) The carbon nanotube dispersion was dropped onto the intermediate layer, allowed to stand for 2 hours to form a carbon nanotube pre-film, and washed with water, ethanol, and isopropyl alcohol;

(6) The drying was performed by applying relative centrifugal acceleration of 200×g, so that the orientation of the first electrode wall of the opposing electrode walls of the electrode pair is parallel (FIG. 5), vertical (FIG. 6), or 45° (FIG. 7) with respect to the centrifugal force to form a carbon nanotube film.

(7) The carbon nanotube film was washed again with water, ethanol, and isopropyl alcohol, and dried by applying a centrifugal force in the same orientation as in the step (6) to obtain a bolometer.

(Method for Measuring Resistance Value)

The resistance value of the bolometer was measured by using a probe manufactured by Cascade Microtech (trade name: SUMMIT 12000B-Series) under an applied voltage of 3V, 300K, and a dry air stream (about 5% RH or less).

The resistance value at 3V is preferably $1.0\times10^{10}\Omega$ or less, and it can be said that the lower the resistance value, the better the carbon nanotubes are bonded to the electrode walls.

Table 1 shows the orientation of the electrode wall with respect to the centrifugal force during drying and the resistance values of the bolometer obtained.

TABLE 1

Orientation of Electrode wall relative to Centrifugal force and Resistance value (Relative centrifugal acceleration: 200 × g)

| Orientation of Electrode wall relative to Centrifugal force | Resistance value (3 V) |
|---|---|
| Parallel | $4.9 \times 10^{10}\Omega$ |
| Vertical | $2.5 \times 10^{7}\Omega$ |
| 45° | $8.5 \times 10^{7}\Omega$ |

Figure 5:
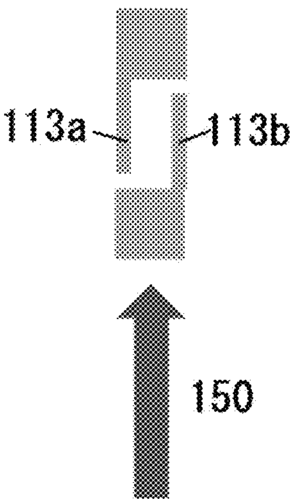
FIG. 5 shows that an orientation of electrode walls to centrifugal force is parallel.
Figure 6:
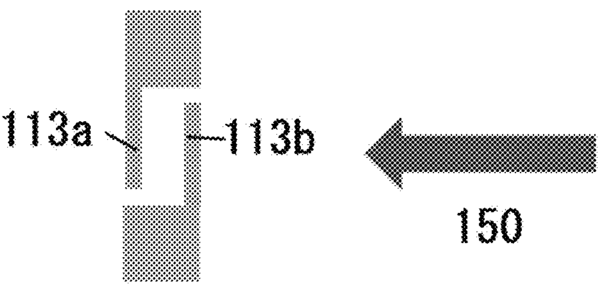
FIG. 6 shows that an orientation of electrode walls to centrifugal force is vertical.
Figure 7:
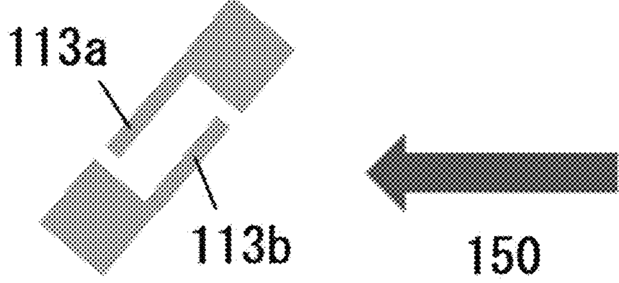
FIG. 7 shows that an orientation of electrode walls to centrifugal force is 45°.

In the drying step after washing the CNT film, the resistance value was high ($4.9\times10^{10}\Omega$) when the orientation of the electrode wall was parallel to the centrifugal force direction of spin coating (FIG. 5). In contrast, the resistance value is dramatically reduced ($2.5\times10^{7}\Omega$) when the orientation of the electrode wall is vertical to the centrifugal force (FIG. 6). When the orientation of the centrifugal force is parallel to the electrode wall, the CNT film between the electrodes is slipped parallel to the electrode due to the centrifugal force, and the force that joins the CNT film edges to the electrode walls is weakened. On the other hand, when the orientation of the centrifugal force is vertical to the electrode wall, the CNTs at the CNT film edges are strongly adhered to the electrode wall. Furthermore, it is conceivable that the effect of removing the surfactant in the carbon nanotube dispersion is enhanced when centrifugal force is applied vertical to the electrode wall.

Also, when the orientation of the centrifugal force is 45° with respect to the electrode wall (FIG. 7), the resistance value is considerably reduced ($8.5\times10^{7}\Omega$) compared to when the centrifugal force is parallel with respect to the electrode wall. This is because the vertical component of the centrifugal force is applied to the electrode wall even when the orientation of the centrifugal force is 45° to the electrode wall.

Example 2

Figure 8:
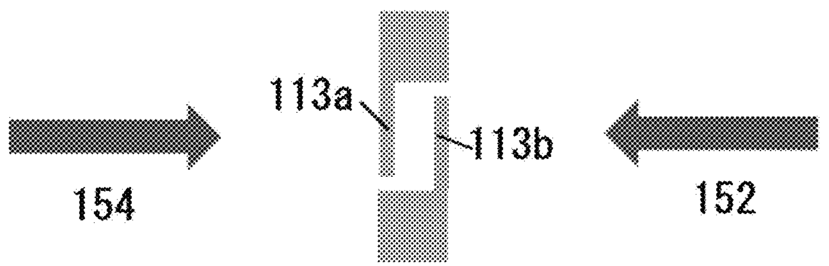
FIG. 8 shows that orientations of electrode walls to centrifugal force are two vertical directions.

The drying of two vertical directions was performed by setting the electrode wall so that it is vertical to the direction of the centrifugal force in the drying step (6) of Example 1, and reversing the direction of the centrifugal force in the drying step (7) (FIG. 8). Table 2 shows the orientation of the electrode wall with respect to the centrifugal force during drying and the resistance value.

TABLE 2

Orientation of Electrode wall relative to Centrifugal force and Resistance value (Relative centrifugal acceleration: 200 × g)

| Orientation of Electrode wall relative to Centrifugal force | Resistance value (3 V) |
|---|---|
| One vertical direction | $2.5 \times 10^{7}\Omega$ |
| Two vertical directions | $5.7 \times 10^{8}\Omega$ |
| Two vertical directions to multiple layers | $2.2 \times 10^{6}\Omega$ |

It was found that the resistance value was further lowered ($5.7\times10^{6}\Omega$) by reversing the orientation of the centrifugal force between the first drying and the second drying in the drying steps after washing the CNT film (FIG. 8). This is because the CNT film edges tightly joined not only the first electrode wall but also the opposite second electrode wall. Applying centrifugal force in two directions was also effective even when multiple layers of CNT films were formed ($2.2\times10^{6}\Omega$). Thus, it was found that the resistance value can be further reduced by drying the CNT film with centrifugal force in both directions with respect to the electrode wall (i.e., applying both of a centrifugal force having a vertical component to the first electrode wall and a centrifugal force having a vertical component to the second electrode wall).

Example 3

In the drying step (6) of Example 1, the electrode wall was placed vertical to the centrifugal force direction, and drying was performed while changing the relative centrifugal acceleration in the range of 50×g to 1000×g. Table 3 shows relative centrifugal acceleration during drying and resistance value of bolometer.

TABLE 3

Relative centrifugal acceleration and Resistance value

| Relative centrifugal acceleration (×g) | Resistance value (3 V) |
|---|---|
| 50 | $4.9 \times 10^{9}\Omega$ |
| 100 | $2.3 \times 10^{8}\Omega$ |
| 150 | $8.7 \times 10^{7}\Omega$ |
| 200 | $2.5 \times 10^{7}\Omega$ |
| 500 | $3.7 \times 10^{7}\Omega$ |
| 700 | $3.2 \times 10^{7}\Omega$ |
| 1000 | $2.1 \times 10^{10}\Omega$ |

In the drying step after washing the CNT film, when the relative centrifugal acceleration applied to the electrode wall was 100×g, 150×g, 200×g, 500×g or 700×g, the resistance value was $1.0\times10^{10}$ or less. It was found that the effect of reducing the resistance value can be obtained when the vertical component of the relative centrifugal acceleration applied to the electrode wall in the drying step is in the range of 50×g to 900×g.

Example 4

The height of the electrode pair formed in the step (2) of Example 1 was changed in the range of 50 nm to 200 nm, and the electrode wall was placed vertical to the direction of centrifugal force and drying was performed by changing the relative centrifugal acceleration in the range of 50×g to 1000×g in the drying step (6). Table 4 shows the relative centrifugal acceleration and resistance value of bolometer at each electrode height.

TABLE 4

| Height of electrodes, Relative centrifugal acceleration and Resistance value | | | |
|---|---|---|---|
| Relative centrifugal | Height of electrodes | | |
| acceleration (×g) | 200 nm | 100 nm | 50 nm |
| 50 | $4.9 \times 10^{9}\Omega$ | $1.3 \times 10^{10}\Omega$ | $7.8 \times 10^{9}\Omega$ |
| 100 | $2.3 \times 10^{8}\Omega$ | $5.7 \times 10^{8}\Omega$ | $9.6 \times 10^{7}\Omega$ |
| 150 | $8.7 \times 10^{7}\Omega$ | $7.6 \times 10^{7}\Omega$ | $3.3 \times 10^{8}\Omega$ |
| 200 | $2.5 \times 10^{7}\Omega$ | $1.2 \times 10^{7}\Omega$ | $8.9 \times 10^{10}\Omega$ |
| 500 | $3.7 \times 10^{7}\Omega$ | $6.5 \times 10^{9}\Omega$ | $4.4 \times 10^{11}\Omega$ |
| 700 | $3.2 \times 10^{7}\Omega$ | $1.1 \times 10^{10}\Omega$ | $1.5 \times 10^{11}\Omega$ |
| 1000 | $2.1 \times 10^{10}\Omega$ | $3.2 \times 10^{11}\Omega$ | $2.2 \times 10^{11}\Omega$ |

Although the range of the vertical component of the relative centrifugal acceleration where the effect of reducing the resistance value can be obtained is 50×g to 900×g, it was found that the effective range of the relative centrifugal acceleration (in particular, the upper limit of relative centrifugal acceleration) depends on the height of the electrodes. It is conceivable that if the centrifugal force during drying is strong, the CNTs containing water will exceed the height of the electrode and will not be able to adhere firmly to the electrode. Alternatively, it is conceivable that if water is removed over the electrode at the initial stage of drying, the effect of removing the surfactant from the CNT edges is reduced. From these results, it was found that the ratio which is the vertical component of relative centrifugal acceleration (×g)/the height of the electrode pair (nm) is preferably less than 4.

Although the present invention has been described with reference to the embodiments and Examples, the present invention is not limited to the above embodiments and Examples. The configuration and the details of the present invention can be modified in various ways within the scope of the present invention that can be understood by those skilled in the art.

(Supplementary Note 1)

A method for manufacturing bolometer comprising:

(A) forming one or more electrode pair(s) on a substrate;

(B) forming an intermediate layer between the electrode pair(s) on the substrate; and (C) forming a carbon nanotube layer, comprising the following (c1) to (c3):

(c1) applying a carbon nanotube dispersion onto the intermediate layer between the electrode pair and allowing it to stand to form a carbon nanotube pre-film;

(c2) washing the carbon nanotube pre-film with a washing solvent; and (c3) drying the washing solvent while applying a centrifugal force, wherein a vertical component of relative centrifugal acceleration with respect to at least one of a first electrode wall and a second electrode wall facing each other of the electrode pair is in the range of 50×g to 900×g.

(Supplementary Note 2)

The method according to Supplementary note 1, wherein the drying of the washing solvent is performed by applying a centrifugal force having a vertical component with respect the first electrode wall and applying a centrifugal force having a vertical component with respect the second electrode wall.

(Supplementary Note 3)

The method according to Supplementary note 1 or 2, wherein the ratio which is the vertical component of the relative centrifugal acceleration with respect to the first electrode wall and/or the second electrode wall (×g)/a height of the electrode pair (nm) is less than 4.

(Supplementary Note 4)

The method according to any of the preceding Supplementary notes, wherein multiple carbon nanotube layers are formed.

(Supplementary Note 5)

The method according to any of the preceding Supplementary notes, wherein the formation of the intermediate layer is performed by applying a silane coupling agent.

(Supplementary Note 6)

The method according to Supplementary note 5, wherein the silane coupling agent is 3-aminopropyltriethoxysilane.

EXPLANATION OF REFERENCE

10 Bolometer
20 Bolometer array
100 Substrate
110 Electrode pair (two electrodes)
**113*a*** First electrode wall
**113*b*** Second electrode wall
120 Intermediate layer
140 Carbon nanotube layer
150 Orientation of centrifugal force
152 Orientation of first centrifugal force
154 Orientation of second centrifugal force

The invention claimed is:

1. A method for manufacturing bolometer comprising:

(A) forming one or more electrode pair(s) on a substrate;

(B) forming an intermediate layer between the electrode pair(s) on the substrate; and (C) forming a carbon nanotube layer, comprising the following (c1) to (c3):

(c1) applying a carbon nanotube dispersion onto the intermediate layer between the electrode pair and allowing it to stand to form a carbon nanotube pre-film;

(c2) washing the carbon nanotube pre-film with a washing solvent; and (c3) drying the washing solvent while applying a centrifugal force, the centrifugal force being applied by rotation in which the electrode pair is arranged such that a vertical component of relative centrifugal acceleration with respect to at least one of a first electrode wall and a second electrode wall facing each other of the electrode pair is in the range of 50×g to 900×g.

2. The method according to claim 1, wherein the drying of the washing solvent is performed by applying a centrifugal force having a vertical component with respect the first electrode wall and applying a centrifugal force having a vertical component with respect the second electrode wall.

3. The method according to claim 1, wherein the ratio which is the vertical component of the relative centrifugal acceleration with respect to the first electrode wall and/or the second electrode wall (×g)/a height of the electrode pair (nm) is less than 4.

4. The method according to claim 1, wherein multiple carbon nanotube layers are formed.

5. The method according to claim 1, wherein the formation of the intermediate layer is performed by applying a silane coupling agent.

6. The method according to claim 5, wherein the silane coupling agent is 3-aminopropyltriethoxysilane.

7. The method according to claim 2, wherein the ratio which is the vertical component of the relative centrifugal acceleration with respect to the first electrode wall and/or the second electrode wall (×g)/a height of the electrode pair (nm) is less than 4.

8. The method according to claim 2, wherein multiple carbon nanotube layers are formed.

9. The method according to claim 2, wherein the formation of the intermediate layer is performed by applying a silane coupling agent.

10. The method according to claim 9, wherein the silane coupling agent is 3-aminopropyltriethoxysilane.

* * * * *